(12) United States Patent
Cundiff et al.

(10) Patent No.: US 8,974,212 B2
(45) Date of Patent: Mar. 10, 2015

(54) SYSTEMS FOR MANUFACTURING COMPOSITE PARTS WITH FEMALE TOOLS

(75) Inventors: Thomas R. Cundiff, Seattle, WA (US); Dennis J. Hanks, Seattle, WA (US); Jack A. Woods, Seattle, WA (US); Val G. Brustad, Seattle, WA (US); Andrew E. Modin, Seattle, WA (US)

(73) Assignee: The Boeing Company, Chicago, IL (US)

( * ) Notice: Subject to any disclaimer, the term of this patent is extended or adjusted under 35 U.S.C. 154(b) by 599 days.

(21) Appl. No.: 12/576,759

(22) Filed: Oct. 9, 2009

(65) Prior Publication Data

US 2010/0074979 A1 Mar. 25, 2010

Related U.S. Application Data

(62) Division of application No. 10/899,660, filed on Jul. 26, 2004, now Pat. No. 7,622,066.

(51) Int. Cl.
*B29C 70/44* (2006.01)
*B29C 70/54* (2006.01)

(52) U.S. Cl.
CPC ............ *B29C 70/541* (2013.01); *B29C 70/44* (2013.01); *B29C 70/543* (2013.01)
USPC .................... 425/342.1; 425/343; 425/389

(58) Field of Classification Search
USPC ............................... 425/339, 342.1, 343, 389
See application file for complete search history.

(56) References Cited

U.S. PATENT DOCUMENTS

| | | | |
|---|---|---|---|
| 1,433,879 A | 10/1922 | Fancher et al. | |
| 1,504,547 A | 8/1924 | Egerton | |
| 1,965,716 A | 7/1934 | Thoms et al. | |
| 2,750,629 A | 6/1956 | Baudou | |
| 2,981,976 A | 5/1961 | Maier | |
| 3,376,184 A | 4/1968 | Ritchey | |
| 3,526,558 A | 9/1970 | Beeson | |
| 3,693,924 A | 9/1972 | Blatherwick | |
| 3,843,756 A | 10/1974 | Talbott et al. | |
| 3,975,363 A | 8/1976 | Jones | |

(Continued)

FOREIGN PATENT DOCUMENTS

| CA | 2487697 A1 | 5/2006 |
|---|---|---|
| DE | 742682 C | 12/1943 |

(Continued)

OTHER PUBLICATIONS

Ando et al., "Growing Carbon Nanotubes," Materials Today, Oct. 2004, vol. 7, No. 10, pp. 22-29.

(Continued)

*Primary Examiner* — Ryan Ochylski
(74) *Attorney, Agent, or Firm* — Yee & Associates, P.C.

(57) ABSTRACT

Methods and systems for manufacturing fiber-reinforced resin parts are disclosed herein. In one embodiment, a method for manufacturing a fiber-reinforced resin part includes positioning a plurality of fibers on a mold surface of a female tool, and covering the fibers with a sealing layer. The method further includes pressing a portion of the covered fibers against an interior transition region (e.g., an internal radius) of the mold surface. While the portion of covered fibers is pressed against the interior transition region, air is removed from between the sealing layer and the mold surface to draw at least a partial vacuum between the sealing layer and the mold surface.

9 Claims, 6 Drawing Sheets

(56) References Cited

U.S. PATENT DOCUMENTS

| | | |
|---|---|---|
| 3,990,291 A | 11/1976 | Evertz et al. |
| 4,132,755 A | 1/1979 | Johnson |
| 4,254,735 A | 3/1981 | Postupack et al. |
| 4,270,964 A | 6/1981 | Flaskett |
| 4,338,070 A | 7/1982 | Nava |
| 4,366,698 A | 1/1983 | Gill |
| 4,367,644 A | 1/1983 | Kramer et al. |
| 4,411,148 A | 10/1983 | Aschauer et al. |
| 4,416,170 A | 11/1983 | Gibson et al. |
| 4,443,401 A | 4/1984 | Turner |
| 4,475,976 A | 10/1984 | Mittelstadt et al. |
| 4,504,341 A | 3/1985 | Radzwill et al. |
| 4,614,558 A | 9/1986 | Kobe |
| 4,657,717 A | 4/1987 | Cattanach et al. |
| 4,726,924 A | 2/1988 | Mittelstadt |
| 4,780,262 A | 10/1988 | Von Volkli |
| 4,902,215 A | 2/1990 | Seemann, III |
| 4,922,232 A | 5/1990 | Bosich |
| 4,933,232 A | 6/1990 | Trout et al. |
| 4,946,526 A | 8/1990 | Petty-Galis et al. |
| 4,961,700 A * | 10/1990 | Dunbar .................. 425/394 |
| 5,015,168 A * | 5/1991 | Boime et al. .............. 425/389 |
| 5,022,248 A | 6/1991 | Brooks et al. |
| 5,040,962 A | 8/1991 | Waszeciak et al. |
| 5,060,501 A | 10/1991 | Heath |
| 5,087,193 A | 2/1992 | Herbert, Jr. |
| 5,108,532 A | 4/1992 | Thein et al. |
| 5,129,813 A | 7/1992 | Shepherd |
| 5,152,949 A | 10/1992 | Leoni et al. |
| 5,178,812 A | 1/1993 | Sanford et al. |
| 5,188,787 A | 2/1993 | King et al. |
| 5,286,438 A | 2/1994 | Dublinski et al. |
| 5,292,475 A | 3/1994 | Mead et al. |
| 5,304,057 A | 4/1994 | Celerier et al. |
| 5,327,764 A | 7/1994 | Weykamp et al. |
| 5,366,431 A | 11/1994 | Smith et al. |
| 5,366,684 A | 11/1994 | Corneau, Jr. |
| 5,464,337 A | 11/1995 | Bernardon et al. |
| 5,582,058 A | 12/1996 | Knudson |
| 5,683,648 A | 11/1997 | Fortin |
| 5,690,973 A | 11/1997 | Kindt-Larsen et al. |
| 5,707,576 A | 1/1998 | Asher |
| 5,714,179 A | 2/1998 | Goodridge et al. |
| 5,772,950 A | 6/1998 | Brustad et al. |
| 5,824,255 A | 10/1998 | Ross et al. |
| 5,830,305 A | 11/1998 | Andersen et al. |
| 5,846,464 A | 12/1998 | Hoffman |
| 5,882,462 A | 3/1999 | Donecker et al. |
| 5,939,007 A | 8/1999 | Iszczyszyn et al. |
| 6,089,061 A | 7/2000 | Haas et al. |
| 6,139,942 A | 10/2000 | Hartness et al. |
| 6,159,414 A | 12/2000 | Tunis, III et al. |
| 6,229,819 B1 | 5/2001 | Darland et al. |
| 6,245,275 B1 | 6/2001 | Holsinger |
| 6,269,677 B1 | 8/2001 | Torvinen et al. |
| 6,299,819 B1 | 10/2001 | Han |
| 6,495,086 B1 * | 12/2002 | Uytterhaeghe et al. ....... 264/322 |
| 6,511,570 B2 | 1/2003 | Matsui |
| 6,558,590 B1 | 5/2003 | Stewart |
| 6,692,681 B1 | 2/2004 | Lunde |
| 6,723,272 B2 | 4/2004 | Montague et al. |
| 6,749,784 B2 | 6/2004 | Blanchon |
| 6,814,916 B2 | 11/2004 | Willden et al. |
| 6,823,578 B2 | 11/2004 | Anderson et al. |
| 6,843,953 B2 | 1/2005 | Filsinger et al. |
| 6,855,284 B2 | 2/2005 | Lanni et al. |
| 6,862,989 B2 | 3/2005 | Belanger et al. |
| 6,929,770 B2 | 8/2005 | Caldwell, Jr. |
| 6,967,000 B2 | 11/2005 | Vaara |
| 7,021,096 B2 | 4/2006 | Barnett |
| 7,091,300 B2 | 8/2006 | Luhmann et al. |
| 7,118,370 B2 | 10/2006 | Willden et al. |
| 7,126,496 B2 | 10/2006 | Greene |
| 7,132,161 B2 | 11/2006 | Knowles et al. |
| 7,141,199 B2 | 11/2006 | Sana et al. |
| 7,160,498 B2 | 1/2007 | Mataya |
| 7,306,450 B2 | 12/2007 | Hanson |
| 7,334,782 B2 | 2/2008 | Woods et al. |
| 7,429,172 B2 | 9/2008 | Chotard |
| 7,464,508 B2 | 12/2008 | Fournie et al. |
| 7,527,759 B2 | 5/2009 | Lee et al. |
| 7,601,421 B2 | 10/2009 | Khabashesku et al. |
| 7,622,066 B2 | 11/2009 | Brustad et al. |
| 7,655,168 B2 | 2/2010 | Jones et al. |
| 7,708,546 B2 | 5/2010 | Lee et al. |
| 7,824,171 B2 | 11/2010 | Hanson et al. |
| 7,951,318 B2 | 5/2011 | Hanson |
| 7,959,753 B2 | 6/2011 | Nunez Delgado et al. |
| 8,105,068 B2 | 1/2012 | Ross et al. |
| 2001/0045684 A1 | 11/2001 | Blanchon |
| 2002/0167119 A1 | 11/2002 | Hemphill |
| 2003/0104094 A1 * | 6/2003 | Sloman .................. 425/389 |
| 2003/0205156 A1 | 11/2003 | Belanger et al. |
| 2003/0234471 A1 | 12/2003 | Kuroiwa et al. |
| 2004/0041304 A1 | 3/2004 | Willden et al. |
| 2004/0043196 A1 | 3/2004 | Willden et al. |
| 2004/0071870 A1 | 4/2004 | Knowles et al. |
| 2004/0145080 A1 | 7/2004 | Tanaka |
| 2004/0145095 A1 | 7/2004 | McCollum et al. |
| 2004/0219855 A1 | 11/2004 | Tsotsis |
| 2005/0051932 A1 | 3/2005 | Danzik |
| 2005/0059309 A1 | 3/2005 | Tsotsis |
| 2005/0073076 A1 | 4/2005 | Woods et al. |
| 2005/0086991 A1 | 4/2005 | Barnett |
| 2005/0142239 A1 | 6/2005 | Frank |
| 2005/0178083 A1 | 8/2005 | Fournie et al. |
| 2006/0017200 A1 | 1/2006 | Cundiff et al. |
| 2006/0068170 A1 | 3/2006 | Hanson |
| 2006/0071817 A1 | 4/2006 | Greene |
| 2006/0166003 A1 | 7/2006 | Khabashesku et al. |
| 2006/0231981 A1 | 10/2006 | Lee et al. |
| 2007/0175171 A1 | 8/2007 | Delgado et al. |
| 2007/0176323 A1 | 8/2007 | Jones et al. |
| 2008/0054523 A1 | 3/2008 | Hanson |
| 2008/0286564 A1 | 11/2008 | Tsotsis |
| 2009/0123588 A1 | 5/2009 | Lee et al. |
| 2009/0320292 A1 | 12/2009 | Brennan et al. |
| 2010/0068326 A1 | 3/2010 | Jones et al. |
| 2010/0074979 A1 | 3/2010 | Cundiff et al. |
| 2010/0102482 A1 | 4/2010 | Jones et al. |
| 2011/0195230 A1 | 8/2011 | Hanson |

FOREIGN PATENT DOCUMENTS

| | | |
|---|---|---|
| DE | 4234002 A1 | 4/1994 |
| DE | 19536675 C1 | 2/1997 |
| EP | 0659541 | 6/1995 |
| EP | 0659541 A1 | 6/1995 |
| EP | 1136239 | 9/2001 |
| EP | 1136239 A2 | 9/2001 |
| EP | 1393873 A2 | 3/2004 |
| EP | 1972428 A2 | 9/2008 |
| EP | 2133263 A2 | 12/2009 |
| FR | 2035314 A5 | 12/1970 |
| FR | 2162296 A1 | 12/1971 |
| FR | 2667013 | 3/1992 |
| FR | 2667013 A1 | 3/1992 |
| FR | 2771332 A1 | 5/1999 |
| FR | 2844472 | 3/2004 |
| FR | 2844472 A1 | 3/2004 |
| GB | 2139934 A | 11/1984 |
| JP | 61043542 A | 3/1986 |
| JP | 2001310798 A | 11/2011 |
| WO | 2004025003 A2 | 3/2004 |
| WO | 2005095091 A1 | 10/2005 |
| WO | 2006014825 A1 | 2/2006 |
| WO | 2006039124 A2 | 4/2006 |
| WO | 2006048652 A1 | 5/2006 |
| WO | 2006113048 A1 | 10/2006 |
| WO | 2010047980 A1 | 4/2010 |

OTHER PUBLICATIONS

Brittles, "New Developments in Resin Transfer Moulding," Proc. 19th International Composites Congress, Nov. 1994, pp. 11-26.

(56) References Cited

OTHER PUBLICATIONS

"A Composite Preform," IP.com Prior Art Database Technical Disclosure No. IPCOM000007326D, dated Mar. 14, 2002, http://www.ip.com/IPCOM/000007326, 4 pages.
European Search Report, dated Aug. 5, 2008, regarding Application No. EP08012344 (EP1972428), 6 pages.
European Search Report, dated Oct. 10, 2011, regarding Application No. EP09251515 (EP2133263), 2 pages.
Garcia et al., "Hybrid Carbon Nanotube-Composite Architectures," MTL Annual Research Report, Sep. 2006, p. 208.
"Growing Carbon Nanotubes Aligned With Patterns," NASA Tech Briefs No. NPO-30205, Oct. 2002, http://nasatech.com/Briefs/Oct02/NPO30205.html, 2 pages.
International Search Report, dated Dec. 7, 2005, regarding Application No. PCT/US2005/026141 (WO2006014825), 3 pages.
International Search Report, dated May 19, 2006, regarding Application No. PCT/US2005/033279 (WO2006039124), 5 pages.
International Search Report, dated Oct. 16, 2006, regarding Application No. PCT/US2006/010825 (WO2006113048), 4 pages.
International Search Report, dated Jan. 27, 2010, regarding Application No. PCT/US2009/060245 (WO2010047980), 3 pages.
"The Longest Carbon Nanotubes You Have Ever Seen," http://www.spacemart.com/reports/The_Longest_Carbon_Nanotubes_You_Have_Ever_Seen_999.html, May 14, 2007, 1 page.
Musch et al., "Tooling With Reinforced Elastomeric Materials," Composites Manufacturing, 1992, vol. 3, No. 2, pp. 101-111.
"The Wondrous World of Carbon Nanotubes," http://students.chem.tue.nl/ifp03/Wondrous%20World%20of%20Carbon%20Nanotubes_Final.pdf, Feb. 27, 2003, pp. 1-23.
USPTO Office Action, dated Mar. 22, 2007, regarding U.S. Appl. No. 10/953,670, 19 pages.
USPTO Notice of Allowance, dated Jul. 31, 2007, regarding U.S. Appl. No. 10/953,670, 6 pages.
USPTO Office Action, dated Sep. 3, 2010, regarding U.S. Appl. No. 11/927,003, 14 pages.
USPTO Notice of Allowance, dated Feb. 2, 2011, regarding U.S. Appl. No. 11/927,003, 9 pages.
USPTO Office Action, dated Apr. 4, 2008, regarding U.S. Appl. No. 10/899,660, 21 pages.
Response to Office Action, dated Jul. 29, 2008, regarding U.S. Appl. No. 10/899,660, 17 pages.
USPTO Final Office Action, dated Oct. 16, 2008, regarding U.S. Appl. No. 10/899,660, 17 pages.
Response to Final Office Action, dated Feb. 13, 2009, regarding U.S. Appl. No. 10/899,660, 20 pages.
USPTO Notice of Allowance, dated Jun. 22, 2009, regarding U.S. Appl. No. 10/899,660, 14 pages.
USPTO Office Action, dated May 28, 2008, regarding U.S. Appl. No. 11/105,104, 14 pages.
USPTO Notice of Allowance, dated Jan. 7, 2009, regarding U.S. Appl. No. 11/105,104, 3 pages.
USPTO Supplemental Notice of Allowance, dated Feb. 12, 2009, regarding U.S. Appl. No. 11/105,104, 4 pages.
USPTO Office Action, dated May 27, 2009, regarding U.S. Appl. No. 12/354,856, 12 pages.
USPTO Notice of Allowance, dated Dec. 23, 2009, regarding U.S. Appl. No. 12/354,856, 8 pages.
USPTO Miscellaneous Communication, dated Mar. 2, 2010, regarding U.S. Appl. No. 12/354,856, 4 pages.
USPTO Office Action, dated Oct. 15, 2008, regarding U.S. Appl. No. 11/344,458, 22 pages.
USPTO Office Action, dated May 6, 2009, regarding U.S. Appl. No. 11/344,458, 6 pages.
USPTO Notice of Allowance, dated Sep. 28, 2009, regarding U.S. Appl. No. 11/344,458, 7 pages.
USPTO Supplemental Notice of Allowance, dated Oct. 30, 2009, regarding U.S. Appl. No. 11/344,458, 4 pages.
USPTO Supplemental Notice of Allowance, dated Nov. 12, 2009, regarding U.S. Appl. No. 11/344,458, 5 pages.
USPTO Office Action, dated Jan. 25, 2012, regarding U.S. Appl. No. 12/623,942, 17 pages.
USPTO Notice of Allowance, dated May 8, 2012, regarding U.S. Appl. No. 12/623,942, 8 pages.
USPTO Office Action, dated May 14, 2012, regarding U.S. Appl. No. 12/138,975, 12 pages.
USPTO Office Action, dated Mar. 9, 2010, regarding U.S. Appl. No. 12/258,404, 9 pages.
USPTO Final Office Action, dated Aug. 27, 2010, regarding U.S. Appl. No. 12/258,404, 10 pages.
USPTO Final Office Action, dated Mar. 11, 2011, regarding U.S. Appl. No. 12/258,404, 8 pages.
USPTO Office Action, dated Jul. 20, 2011, regarding U.S. Appl. No. 12/258,404, 6 pages.
USPTO Final Office Action, dated Jan. 17, 2012, regarding U.S. Appl. No. 12/258,404, 7 pages.
Office Action, dated Dec. 5, 2012, regarding U.S. Appl. No. 13/090,746, 38 pages.
Final Office Action, dated May 15, 2013, regarding U.S. Appl. No. 13/090,746, 19 pages.
Notice of Allowance, dated Jun. 10, 2013, regarding U.S. Appl. No. 12/258,404, 38 pages.
Notice of Allowance, dated Nov. 26, 2013, regarding U.S. Appl. No. 13/090,746, 21 pages.

* cited by examiner

Fig. 7

SYSTEMS FOR MANUFACTURING COMPOSITE PARTS WITH FEMALE TOOLS

This application is a divisional of application Ser. No. 10/899,660, filed Jul. 26, 2004, now U.S. Pat. No. 7,622,066.

TECHNICAL FIELD

The following disclosure relates generally to composite part manufacturing and, more particularly, to tooling aids for manufacturing composite parts with female tools.

BACKGROUND

Fiber-reinforced resin materials, or "composite" materials as they are commonly known, have many applications in the aerospace, automotive, and marine fields because of their high strength-to-weight ratios, corrosion resistance, and other unique properties. Conventional composite materials typically include glass, carbon, or polyamide fibers in woven and/or non-woven configurations. The fibers can be pre-impregnated with uncured resin to form fiber plies in a raw material stage. The fiber plies can be manufactured into parts by laminating them on a mold surface. Heat and pressure can be applied to the laminated plies to cure the resin and harden the laminate in the shape of the mold. The heat and pressure can be applied with an autoclave, a heated flat or contoured forming tool, or a combination of methods including the use of a vacuum bag.

Composite parts can be formed in the above manner on both male and female tools. With male tools, the fiber plies are applied to an exterior mold surface that forms an inner mold line of the part. Adding plies to the lay-up on a male tool increases the thickness of the part and changes the outer mold line, but the inner mold line remains unchanged. Conversely, with female tools, the fiber plies are applied to an interior mold surface that forms an outer mold line of the part. Adding plies to the lay-up on a female tool increases the thickness of the part and changes the inner mold line, but the outer mold line remains unchanged.

Female tools are desirable when the mating surface is located on the exterior of a part because female tools allow the outer mold line (i.e., the exterior surface) to be tightly controlled. Female tooling (also known as outer mold line tooling) is also desirable when making multiple parts having the same external dimensions but different thicknesses. Aircraft, for example, often include multiple fuselage frames having the same external dimensions but different thicknesses. In this situation, a single female tool can be used to make all of the frames, regardless of thickness, because the female tool allows the thickness to vary without changing the external dimensions. If future growth of the aircraft requires further thickening of the frames, this can be achieved without changing tooling. Conversely, if male tooling were used, then a separate tool would be required for each different frame thickness.

Figure 1:
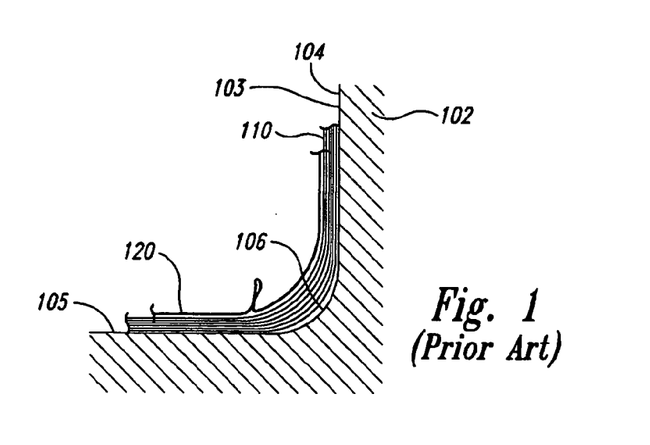
FIG. 1 is a cross-sectional end view of fiber material laid up on a female tool in accordance with the prior art.

One problem that arises when manufacturing composite parts with female tooling is that the fiber plies tend to bridge across internal radii on the mold surface. FIG. 1, for example, illustrates a cross-sectional end view of fiber material 110 laid up on a portion of a female tool 102 in accordance with the prior art. The female tool 102 includes an interior mold surface 104 having a first side region 103 spaced apart from a second side region 105 by a radius region 106. A vacuum bag 120 is positioned over the fiber material 110. As the vacuum bag 120 is evacuated, the outside air pressure presses the fiber material 110 firmly against the side regions 103 and 105, resisting movement of the fiber material 110 into the radius region 106. This resistance causes the fiber material 110 to bridge across the radius region 106, reducing the fiber density in this region.

SUMMARY

The present invention is directed generally toward methods and systems for manufacturing composite parts with female tools. A method for manufacturing a composite part in accordance with one aspect of the invention includes positioning a plurality of fibers on a mold surface of a tool, and covering the fibers with a sealing layer. The method can further include pressing a portion of the covered fibers against an interior transition region of the mold surface with a pressing device. While the portion of covered fibers is being pressed against the interior transition region, air can be removed from between the sealing layer and the mold surface to draw at least a partial vacuum between the sealing layer and the mold surface. In one embodiment, the portion of covered fibers can be pressed against the interior transition region of the mold surface by a pneumatic pressing device. In another embodiment, the portion of covered fibers can be pressed against the interior transition region by a mechanical pressing device.

A tooling system for manufacturing a composite part in accordance with another aspect of the invention includes a tool and a tooling aid configured to cooperate with the tool. The tool can have a mold surface with a first side region, a second side region, and an interior transition region positioned between the first and second side regions. The tooling aid can include an outwardly movable pressing device configured to compress a portion of fibers against the interior transition region of the mold surface when manufacturing a composite part with the tool. In one embodiment, the pressing device can include an inflatable member. In another embodiment, the pressing device can include a mechanical driver.

DETAILED DESCRIPTION

The following disclosure describes methods and systems for manufacturing composite parts. Certain details are set forth in the following description and in FIGS. 2-7 to provide a thorough understanding of various embodiments of the invention. Other details describing well-known structures and systems often associated with composite parts and composite part manufacturing are not set forth in the following disclosure to avoid unnecessarily obscuring the description of the various embodiments of the invention.

Many of the details, dimensions, angles, and other features shown in the Figures are merely illustrative of particular embodiments of the invention. Accordingly, other embodiments can have other details, dimensions, angles, and features without departing from the spirit or scope of the present invention. In addition, further embodiments can be practiced without several of the details described below.

In the Figures, identical reference numbers identify identical or at least generally similar elements. To facilitate the discussion of any particular element, the most significant digit or digits of any reference number refer to the Figure in which that element is first introduced. For example, element 230 is first introduced and discussed with reference to FIG. 2.

Figure 2:
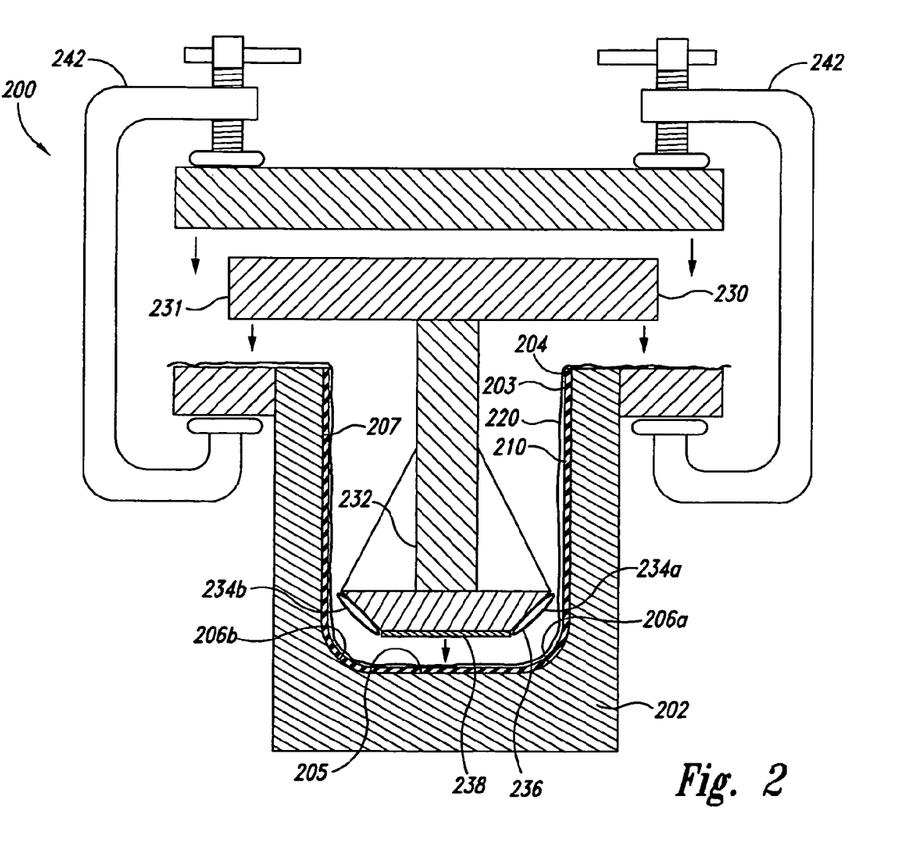
FIG. 2 is a partially exploded, cross-sectional end view of a composite tooling system configured in accordance with an embodiment of the invention.

FIG. 2 is a partially exploded, cross-sectional end view of a composite tooling system 200 configured in accordance with an embodiment of the invention. In one aspect of this embodiment, the tooling system 200 includes a tooling aid 230 configured to cooperate with a female tool 202 ("tool 202"). The tool 202 can include an interior mold surface 204 forming a U-shaped channel having a first side region 203 spaced apart from a second side region 205 by a first transition region 206a, and a third side region 207 spaced apart from the second side region 205 by a second transition region 206b. In the illustrated embodiment, the transition regions 206 include surfaces defining internal radii. In other embodiments, however, the transition regions 206 can have other shapes without departing from the spirit or scope of the present invention. Such shapes can include, for example, beveled surfaces and curved surfaces with elliptical, oval, and other curved components.

To manufacture a composite part with the tool 202, a fiber material 210 is positioned against the mold surface 204. A sealing layer 220 (e.g., a vacuum bag) can be positioned over the fiber material 210 for subsequent evacuation of the space between the sealing layer 220 and the mold surface 204. In one embodiment, the fiber material 210 can include a plurality of woven and/or non-woven fibers preimpregnated with resin. In another embodiment, the fiber material 210 can be applied to the mold surface 204 dry and infused with resin during or after the evacuation process. One method for infusing a dry fiber lay up with resin is described in detail in co-pending U.S. application Ser. No. 10/485,725, entitled "CONTROLLED ATMOSPHERIC PRESSURE RESIN INFUSION," filed May 28, 2003 as PCT Application PCT/US03/16794, and incorporated herein in its entirety by reference.

The tooling aid 230 can include a support portion 232 extending downwardly from a base portion 231. The base portion 231 can be held against the tool 202 by an arrangement of clamping devices 242 to position the support portion 232 in the tool 202. As described in greater detail below, when the support portion 232 is fully positioned in tool 202, a holding device 238 (e.g., a pad) positioned on a distal end of the support portion 232 presses against the sealing layer 220 and traps a portion of the fiber material 210 against the second side region 205 of the mold surface 204. The holding device 238 can include a compressible material such as rubber, or other materials such as Teflon, plastic, etc. that can hold the fiber material 210 in position against the tool surface without damaging the sealing layer 220.

The tooling aid 230 further includes a first pressing device 234a and a second pressing device 234b positioned toward the distal end of the support portion 232. The pressing devices 234 are positioned to face outwardly toward the corresponding transition regions 206 of the tool 202 when the support portion 232 is fully positioned in the tool 202. Each of the pressing devices 234 of the illustrated embodiment includes an expandable member 236 (e.g., an inflatable bladder, tube, etc.) that expands outwardly against the corresponding transition region 206 when inflated, as described in more detail below with reference to FIGS. 3A-3C. In one embodiment, the expandable members 236 can include flexible and/or elastic materials such as rubber, fiber-reinforced rubber, plastic, nylon, etc. In other embodiments, the expandable members 236 can include other suitably flexible and/or expandable materials. The expandable members 236 can be at least partially attached to the support portion 232 by an adhesive or other means to facilitate positioning in the tool 202. In other embodiments, however, the expandable members 236 do not have to be attached to the support portion 232, and can instead be manually positioned between the support portion 232 and the corresponding transition regions 206 for use.

Figure 3A:
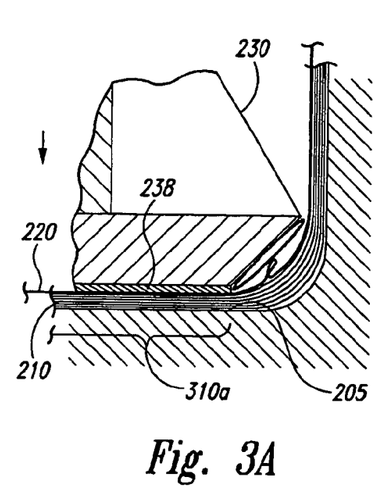
FIGS. 3A-3C are enlarged, cross-sectional end views of a portion of the tooling system of FIG. 2, illustrating operation of a tooling aid configured in accordance with an embodiment of the invention.

FIGS. 3A-3C are enlarged, cross-sectional end views of a portion of the tooling system 200 of FIG. 2, illustrating operation of the tooling aid 230 in accordance with an embodiment of the invention. Referring first to FIG. 3A, operation begins by clamping the tooling aid 230 into position in the tool 202 using for example, the clamping devices 242 of FIG. 2. In this position, the holding device 238 contacts the sealing layer 220 and compresses a first portion 310a of the fiber material 210 against the second side region 205.

Figure 3B:
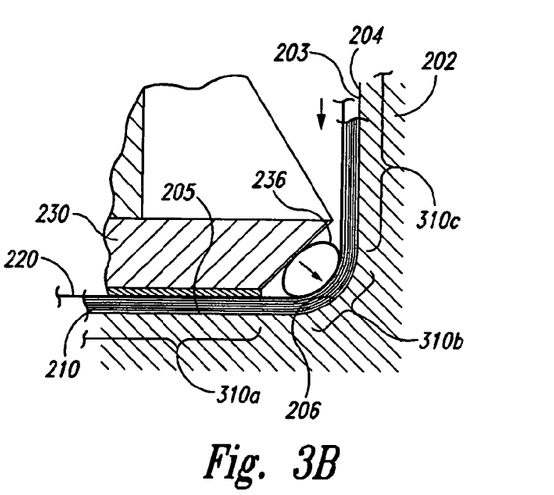

Referring next to FIG. 3B, while the first portion 310a of the fiber material 210 is held against the second side region 205, the expandable member 236 is inflated to compress an adjacent second portion 310b of the fiber material 210 into the transition region 206. As the second portion 310b of fiber material 210 is compressed into the transition region 206, a third portion 310c of the fiber material 210 moves downwardly along the first side region 203 as needed to accommodate movement of the second portion 310b. While the expandable member 236 is fully inflated, at least a partial vacuum is drawn between the sealing layer 220 and the mold surface 204. The resulting air pressure caused by the vacuum holds the fiber material 210 firmly in place against the transition region 206 and the other portions of the mold surface 204.

Figure 3C:
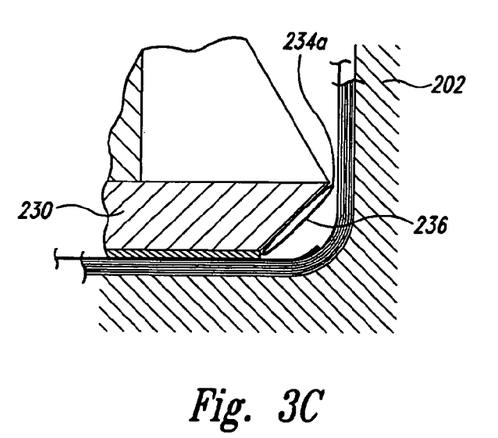

After the sealing layer 220 has been sufficiently evacuated, the expandable member 236 can be deflated as shown in FIG. 3C. The tooling aid 230 can then be removed from the tool 202. If the fiber material 210 includes resin at this stage, then the lay-up is ready for curing. Alternatively, if the fiber material 210 was applied dry, then resin can be infused with the fibers using a suitable resin infusion process, such as that described in co-pending U.S. patent application Ser. No. 10/485,725, filed May 28, 2003. After resin infusion, the lay-up can be cured using an autoclave, oven, or other suitable curing process.

Use of the tooling aid 230 in the manner described above with reference to FIGS. 2-3C can prevent the fiber material 210 from bridging across the interior transition regions 206 of the tool 202. One advantage of this feature is that the resulting composite part may not have reduced fiber density in corresponding transition regions. Another advantage is that a single female tool can be used to manufacture a wide range of parts (e.g., frames) having the same external dimensions but different thicknesses.

Figure 4A:
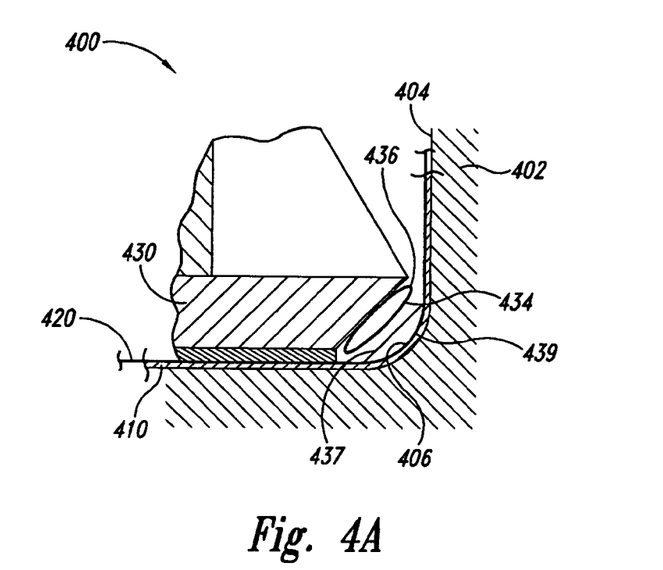
FIGS. 4A and 4B are cross-sectional end views of a composite tooling system that includes a contoured former configured in accordance with another embodiment of the invention.
Figure 4B:
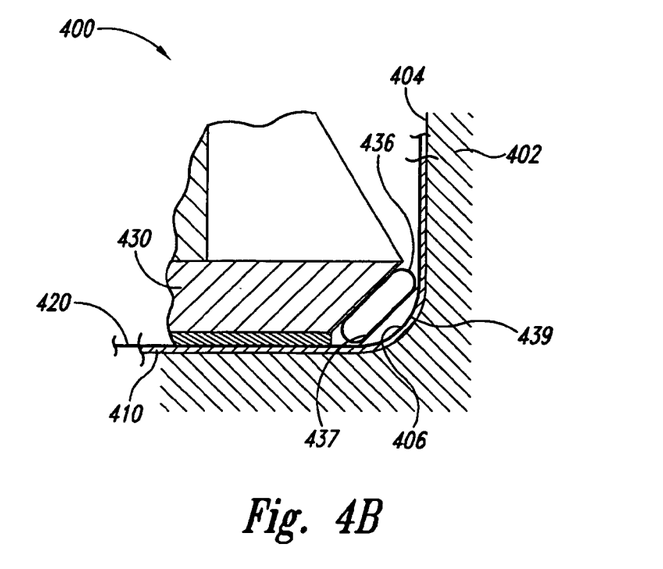

FIGS. 4A and 4B are cross-sectional end views of a portion of a tooling system 400 that utilizes a contoured former 437 in accordance with another embodiment of the invention. Referring first to FIG. 4A, the tooling system 400 includes a female tool 402 ("tool 402") and a tooling aid 430 that are at least generally similar in structure and function to the female tool 202 and the tooling aid 230, respectively, described above with reference to FIGS. 2-3C. Accordingly, the tooling aid 430 includes a pressing device 434 having an expandable member 436 that is at least generally similar in structure and function to the expandable member 236 described above with reference to FIGS. 2-3C.

In the illustrated embodiment, a fiber material 410 is positioned on a mold surface 404 of the tool 402, and a sealing layer 420 is positioned over the fiber material 410. The contoured former 437 is positioned against the sealing layer 420 in a transition region 406 of the mold surface 404. The contoured former 437 can include an outer forming surface 439 that at least approximates the shape of the transition region 406.

As shown in FIG. 4B, as the expandable member 436 is inflated, it drives the contoured former 437 into the transition region 406, thereby compressing a portion of the fiber material 410 into the transition region 406. While the expandable member 436 is inflated, the sealing layer 420 is evacuated to hold the fiber material 410 in position against the mold surface 404. After evacuating the sealing layer 420, the inflatable device 436 is deflated and the tooling aid 430 and the contoured former 437 can be removed from the tool 402 for curing of the lay-up as described above with reference to FIGS. 3A-3C.

Figure 5:
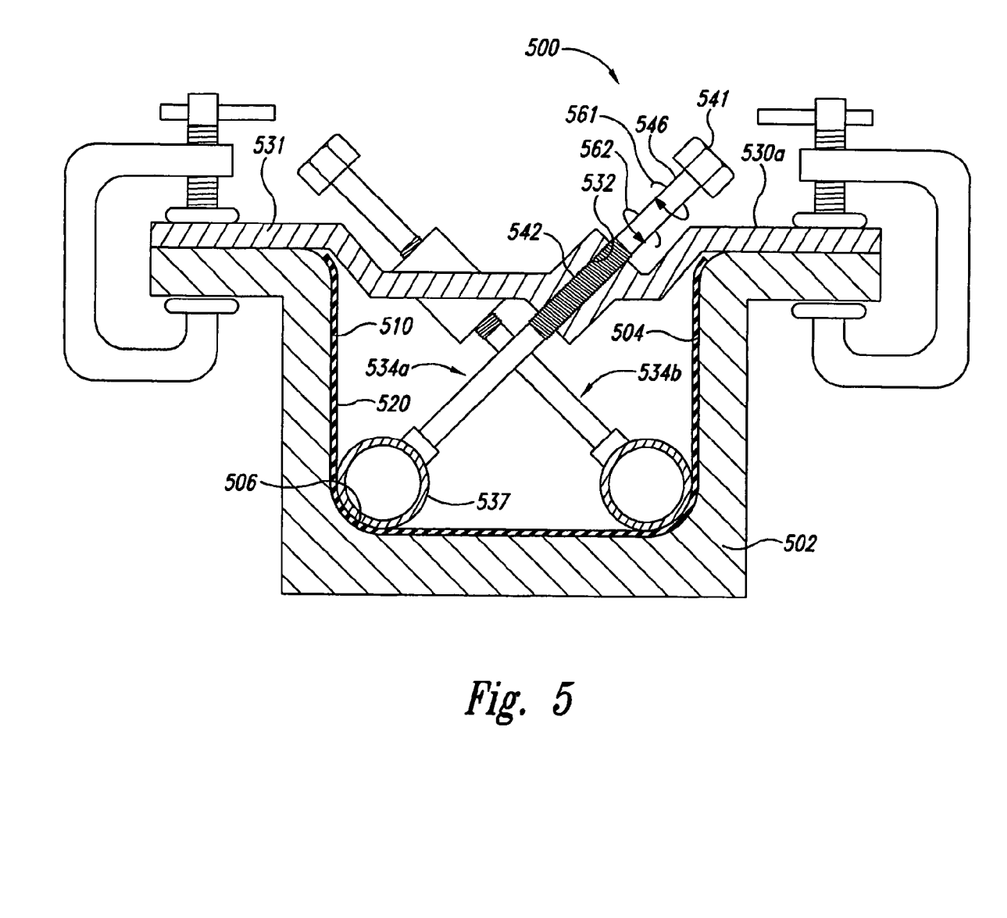
FIG. 5 is a cross-sectional end view of a composite tooling system that includes a mechanical pressing device configured in accordance with a further embodiment of the invention.

Although the pressing devices 234 and 434 described above with reference to FIGS. 2-4B include expandable (e.g., inflatable) members, in other embodiments, other types of pressing devices can be used to compress and/or compact fiber material into interior transition regions in accordance with the present invention. FIG. 5, for example, is a cross-sectional end view of a composite tooling system 500 that includes a tooling aid 530 configured to cooperate with a female tool 502 ("tool 502"). The tool 502 includes a mold surface 504 having a first transition region 506a spaced apart from a second transition region 506b. The tooling aid 530 includes mechanical pressing devices 534 (identified individually as a first pressing device 534a and a second pressing device 534b) configured in accordance with another embodiment of the invention.

Each of the mechanical pressing devices 534 includes at least one driving member 546 rotatably coupled to a contoured former 537. The contoured formers 537 can include rigid or semi-rigid tubular segments having cross-sectional radii that approximate the curvature of the corresponding transition regions 506 of the mold surface 504. In the illustrated embodiment, each of the driving members 546 includes a threaded portion 542 threadably engaging a corresponding threaded bore 533 extending through a base portion 531 of the tooling aid 530. The base portion 531 can be temporarily fixed to the tool 502 by clamps or other suitable devices. Each of the driving members 546 further includes a head portion 541 configured to be turned by a wrench or other torquing device.

Rotation of the driving members 546 in a first direction 561 moves the corresponding contoured formers 537 toward the adjacent transition regions 506. In this manner, the pressing devices 534 can be used to compress a fiber material 510 into the transition regions 506 while the space under a sealing layer 520 is at least partially evacuated as described above with reference to FIGS. 2-3C. Once a vacuum or partial vacuum has been drawn, the driving members 546 can be rotated in a second direction 562 to move the corresponding contoured formers 537 away from the adjacent transition regions 506 to facilitate removal of the tooling aid 530 from the tool 502 for subsequent operations. If the fiber material 510 was pre-impregnated with resin, such operations can include resin curing. Alternatively, if the fiber material 510 was applied dry, such operations can include resin infusion followed by curing.

Figure 6:
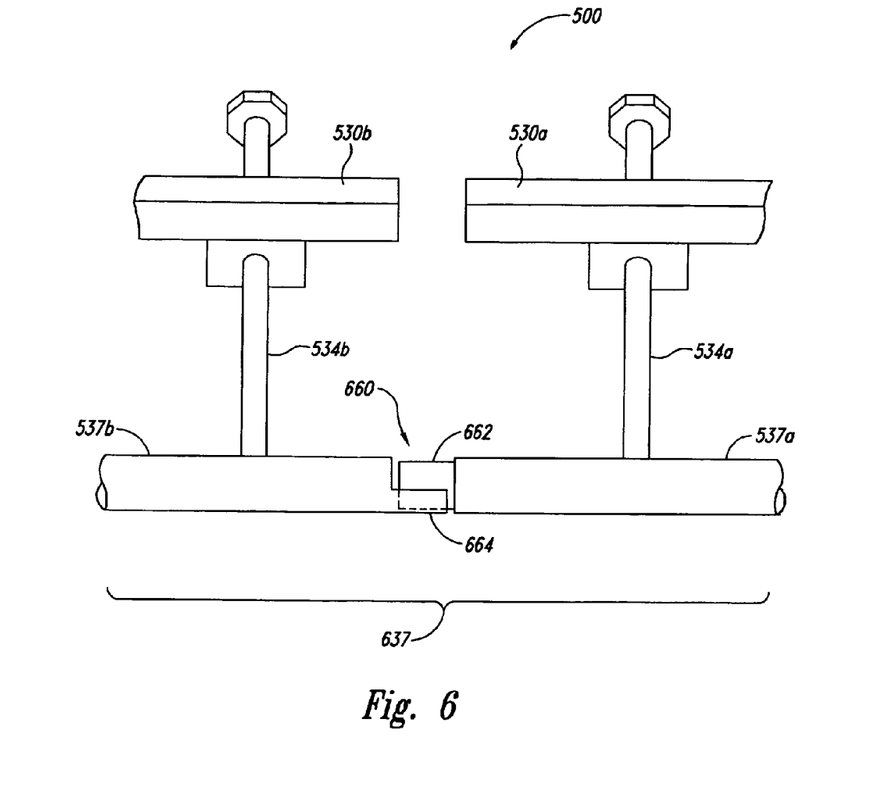
FIG. 6 is a side elevation view of two tooling aids for the purpose of illustrating an interlocking feature configured in accordance with an embodiment of the invention.

FIG. 6 is a side elevation view of two of the tooling aids 530 (identified individually as a first tooling aid 530a and a second tooling aid 530b) positioned end-to-end for the purpose of illustrating an interlocking feature 660 configured in accordance with an embodiment of the invention. Such an arrangement may be necessary and/or advantageous when manufacturing composite parts with a relatively long and/or curved female tool (not shown). For such parts, multiple tooling aids 530 can be arranged in end-to-end fashion as required to accommodate the length and/or curvature of the particular tool. To avoid localized fiber bridging between the adjacent contoured formers 537 (identified individually as a first contoured former 537a and a second contoured former 537b for ease of reference), an interlocking feature, such as the interlocking feature 660, can be utilized to provide continuous pressure along the corresponding interior transition region of the tool.

In the illustrated embodiment, the interlocking feature 660 includes a male portion 662 extending from the first contoured former 537a, and a corresponding female portion 664 extending from the adjacent second contoured former 537b. The female portion 664 is configured to receive the male portion 662 in an overlapping manner to provide an at least approximately continuous contoured former 637. In this way, the interlocking tooling aids 530 can provide at least approximately continuous pressure over long and/or curved transition regions of a female tool.

Figure 7:
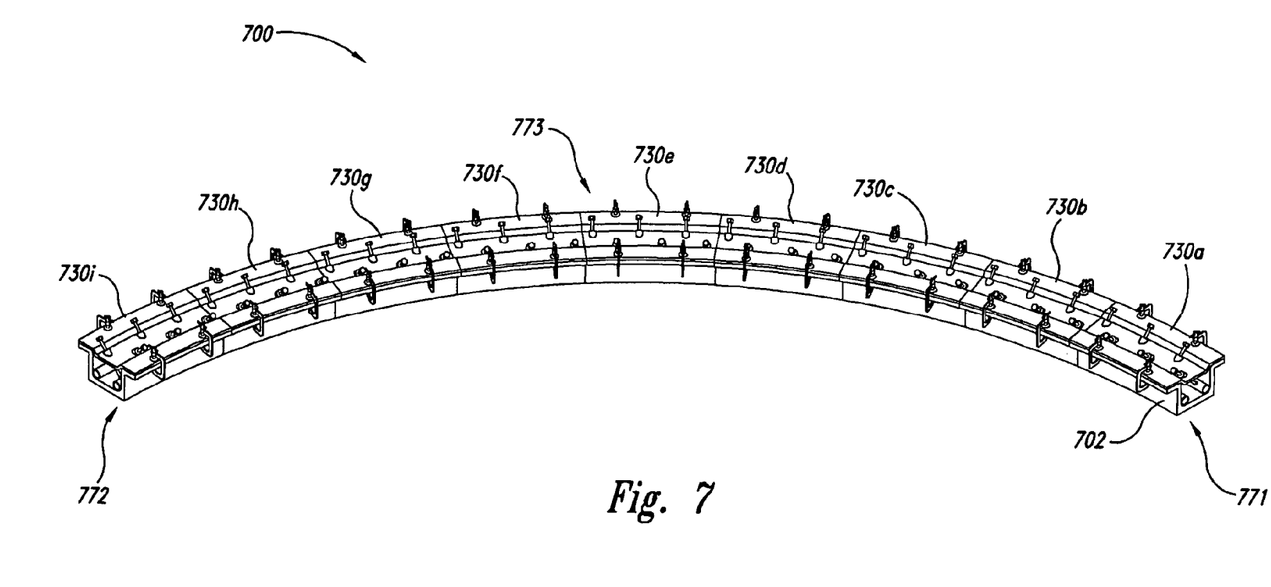
FIG. 7 is an isometric view of a composite tooling system having a plurality of tooling aid segments arranged in end-to-end fashion in accordance with an embodiment of the invention.

FIG. 7 is an isometric view of a composite tooling system 700 that includes a plurality of tooling aids 730 (identified individually as tooling aids 730a-730i) positioned end-to-end in a female tool 702 in accordance with an embodiment of the invention. In one aspect of this embodiment, the tooling aids 730 can be at least generally similar in structure and function to the tooling aids 530 described above with reference to FIGS. 5 and 6. In other embodiments, however, tooling aids that are at least generally similar to the tooling aids 230 and 430 described above with reference to FIGS. 2-4 can be used with the tool 702 in a manner similar to that illustrated in FIG. 7.

In another aspect of this embodiment, the tool 702 is curved and relatively long. Such a tool can be used, for example, to manufacture composite frame sections for aircraft fuselages and/or other structures. When manufacturing such parts with the tooling system 700, pressure from the tooling aids 730 can be applied to the composite material (not shown) in at least one of two ways. The first method involves applying pressure with the tooling aid 730e near a mid-portion 773 of the tool 702 first, and then working outwardly from there toward a first end 771 and an opposite second end 772. The second method involves applying pressure with the tooling aid 730a near the first end 771 of the tool 702 first, and then working from there toward the second end 772. Applying pressure to the composite material using one of these two methods can avoid material bunching and/or wrinkles in the finished part. For composite parts having ply-ramps or joggles, the contoured formers 537 (FIGS. 5 and 6) can include corresponding ramps or joggles to match the tool surface dimensions on either side of the features to avoid bridging fibers in the composite material over these features.

From the foregoing, it will be appreciated that specific embodiments of the invention have been described herein for purposes of illustration, but that various modifications may be made without deviating from the spirit and scope of the invention. For example, aspects described in the context of particular embodiments can be combined or eliminated in other embodiments. Accordingly, the invention is not limited, except as by the appended claims.

We claim:

1. A tooling system for manufacturing a fiber-reinforced resin part, the tooling system comprising:
a tool having a female mold surface configured to support a plurality of fibers covered by a sealing layer, the female mold surface having a first side region, a second side region, a third side region, a first interior transition region positioned between the first side region and the second side region, and a second interior transition region positioned between the second side region and the third side region;
a tooling aid having:
a base portion held against the tool;
a support member extending downwardly from the base portion;
a first pressing device carried by the support member and configured to move outwardly away from the support member to compress a first portion of the plurality of fibers between the first pressing device and the first interior transition region, the first pressing device configured to compress the first portion of the plurality of fibers without compressing other portions of the plurality of fibers against the first side region, the second side region, or the third side region; and
a second pressing device carried by the support member and configured to move outwardly away from the support member to compress a second portion of the plurality fibers between the second pressing device and the second interior transition region, the second pressing device configured to compress the second portion of the plurality of fibers without compressing other portions of the plurality of fibers against the first side region, the second side region, or the third side region; and
a vacuum configured to remove air from between the sealing layer and the mold surface while pressing the first portion of the plurality of fibers between the first pressing device and the first interior transition region, and while pressing the second portion of the plurality fibers between the second pressing device and the second interior transition region, drawing at least a partial vacuum between the sealing layer and the mold surface.

2. The tooling system of claim 1 wherein the female mold surface of the tool forms a U shaped channel, and wherein the support member is configured to be inserted into the U-shaped channel to position the first pressing device proximate to the first interior transition region and the second pressing device proximate to the second interior transition region.

3. The tooling system of claim 2, wherein a surface of the first interior transition region comprises a curve.

4. The tooling system of claim 1 wherein the first and second pressing devices are positioned symmetrically relative to the support member.

5. The tooling system of claim 1, further comprising the sealing layer configured to provide an air-tight cover between the plurality of fibers and the first and second pressing devices.

6. The tooling system of claim 1, wherein a surface of the first interior transition region comprises a curve and wherein the planar first side region is positioned at an angle of from about 80 degrees to about 100 degrees relative to the planar second side region.

7. The tooling system of claim 1, further comprising:
a first former separate from the first pressing device, wherein the first pressing device is outwardly movable against the first former to compress the first portion of the plurality of fibers between the first former and the first interior transition region, the first former having an outer forming surface that at least approximates a shape of the first transition region; and
a sealing layer configured to provide an air-tight cover between the portion of fibers and the former.

8. The tooling system of claim 7, further comprising:
a second former separate from the second pressing device, wherein the second pressing device is outwardly movable against the second former to compress the second portion of the plurality of fibers between the second former and the second interior transition region, the second former having an outer forming surface that at least approximates a shape of the second transition region.

9. A tooling system for manufacturing a fiber-reinforced resin part, the tooling system comprising:
a tool having a female mold surface with a planar first side region, a planar second side region, and a curved interior transition region positioned between the planar first side region and the planar second side region; and
a tooling aid comprising:
a base portion held against the tool;
a support member extending downwardly from the base portion, the support member positioned in the tool;
a holding device positioned on a distal end of the support member, the holding device configured to compress a first portion of fibers against the planar second side region without pressing a second portion of the covered fibers against the first side region of the mold surface, when the support member is positioned in the tool; and
an outwardly movable pressing device operably coupled to the support member and configured, while pressing the first portion of covered fibers against the second side region, to move outwardly away from the support member to compress a third portion of fibers against the curved interior transition region, without pressing the second portion of covered fibers against the second side region of the mold surface.

* * * * *